United States Patent
Smith (10) Patent No.: US 6,983,672 B2
(45) Date of Patent: Jan. 10, 2006

(54) BICYCLE CRANK AXLE BEARING ASSEMBLY

(75) Inventor: Garrett Andrew Smith, San Luis Obispo, CA (US)

(73) Assignee: Truvativ Int'l Co., Ltd., (TW)

( * ) Notice: Subject to any disclaimer, the term of this patent is extended or adjusted under 35 U.S.C. 154(b) by 0 days.

(21) Appl. No.: 10/052,686

(22) Filed: Jan. 18, 2002

(65) Prior Publication Data

US 2002/0096015 A1 Jul. 25, 2002

Related U.S. Application Data

(60) Provisional application No. 60/262,731, filed on Jan. 19, 2001.

(51) Int. Cl.
*F16C 43/00* (2006.01)
(52) U.S. Cl. ..................... 74/594.1; 384/537
(58) Field of Classification Search ............... 384/545, 384/458, 510, 537; 74/594.1
See application file for complete search history.

(56) References Cited

U.S. PATENT DOCUMENTS

| | | | |
|---|---|---|---|
| 596,846 A * | 1/1898 | Brown ....................... 74/594.2 |
| 627,597 A * | 6/1899 | Scott ........................ 74/594.2 |
| 648,077 A * | 4/1900 | Ludlow ........................ 403/24 |
| 3,578,829 A * | 5/1971 | Hata et al. .................. 384/458 |
| 3,903,754 A | 9/1975 | Morroni |
| 3,943,803 A * | 3/1976 | Hafla .......................... 82/147 |
| 4,093,325 A | 6/1978 | Troccaz |
| 4,191,488 A * | 3/1980 | Bickerton ................... 403/370 |
| 4,545,691 A * | 10/1985 | Kastan et al. ............... 384/458 |
| 4,552,468 A * | 11/1985 | Hopper, Jr. .................. 384/458 |
| 4,606,658 A * | 8/1986 | Hofmann et al. ........... 384/510 |
| 4,788,758 A * | 12/1988 | Gordon et al. ......... 29/898.062 |
| 4,790,421 A * | 12/1988 | Gorges ........................ 193/37 |
| 4,810,040 A | 3/1989 | Chi |
| 5,209,581 A | 5/1993 | Nagano |
| 5,281,003 A | 1/1994 | Herman |
| 5,426,997 A * | 6/1995 | Brion ........................ 74/594.1 |
| 5,474,387 A | 12/1995 | King |
| 5,493,937 A * | 2/1996 | Edwards ..................... 74/594.1 |
| 5,597,242 A * | 1/1997 | Beeler ........................ 384/517 |
| 5,975,768 A * | 11/1999 | Hoffman et al. ............ 384/545 |
| 6,116,114 A * | 9/2000 | Edwards ..................... 74/594.1 |
| 6,276,234 B1 * | 8/2001 | Harrington ................. 74/594.3 |

FOREIGN PATENT DOCUMENTS

| EP | 0 792 796 A1 | 3/1997 |
|---|---|---|
| FR | 2 780 698 A1 | 7/2000 |

OTHER PUBLICATIONS

"Nachi Ball & Roller Bearings", Nachi-Fujikoshi Corp., 1991, p. T99 Fig. 8.21, Catalog No. B1100E, Japan.

* cited by examiner

*Primary Examiner*—Chong H. Kim
(74) *Attorney, Agent, or Firm*—Milan Milosevic; Lisa Wunderlich (57) ABSTRACT

A bottom bracket assembly for a bicycle is comprised of a spindle and at least two cartridge bearings. The inner races of the cartridge bearings are axially fixed on the spindle by abutting stop elements. Crank arms attached to the ends of the spindle axially abut the outer stop elements, thus ensuring the precise and consistent axial location of the crank arms. Since the inner bearing races are fixed axially, the outer race of at least one cartridge bearing may be allowed to float in an axial direction to ensure proper alignment of the inner and outer races and the greatest possible bearing life for the bottom bracket.

10 Claims, 8 Drawing Sheets

BICYCLE CRANK AXLE BEARING ASSEMBLY

This application claims the benefit of Provisional Application No. 60/262,731, filed Jan. 19, 2001.

TECHNICAL FIELD

The present invention relates to the field of bicycles, more particularly to a bottom bracket assembly for a bicycle.

BACKGROUND OF THE INVENTION

Typical human powered bicycles are propelled by pedals mounted on cranks at opposite ends of an axle. The cranks drive the axle, on which usually one or more sprockets are mounted that engage a chain to transfer the rotary motion to a rear wheel. The part of the bicycle frame where the axle is mounted is called the bottom bracket. Here, the axle is rotatably held in a bearing, so that it can rotate with very low friction.

For mounting the axle with low friction, ball bearings are employed, consisting of inner and outer races with interposed bearing balls. In many known bottom bracket assemblies, the inner race is formed as a part of the axle or spindle. However, this has proven to create a number of problems. Bearing races must be very hard, and hence brittle, due to high contact stresses present in rolling element ball bearings. Brittleness, however, is highly undesired for the spindle because it reduces the ability of the spindle to absorb high impact energies occurring in some situations.

One example of a bottom bracket bearing assembly where the inner races of ball bearings are formed by the spindle itself is described in French patent 270,698 to Bazille.

Other known bottom bracket bearings of the prior art make use of sealed cartridge bearings, which integrate the two races with the bearing and are available as readily assembled units. Cartridge bearings can easily be replaced when worn or damaged. The successful use of cartridge bearings in bicycle bottom brackets, however, requires the designer to ensure that the inner and outer bearing races are correctly aligned. If axial loads lead to misalignment of the bearing races during assembly or use of the bottom bracket, damage is likely to occur.

If the both the inner and outer bearing races of a cartridge bearing are fixed axially in the bottom bracket assembly, correct alignment can only be ensured by very tight control of manufacturing dimensions and tolerances. The distance between the fixed positions of the two outer bearing races must be nearly identical to the distance between the inner bearing races. This has proven to raise manufacturing cost and make the overall bottom bracket design intolerant to manufacturing and assembly variations.

A number of known bottom bracket assemblies of the prior art solve the problem of correct alignment of the inner and outer bearing races by allowing the inner races to float on the spindle while the outer races are fixed in an outer bracket portion, typically being clamped between a shell and adapters inserted at both ends. However, this design makes it difficult to efficiently incorporate crank stops into the bottom bracket. Crank stops are a desirable addition to a bottom bracket because they ensure correct and consistent axial alignment of the installed crank arms.

U.S. Pat. No. 3,903,754 to Morroni and U.S. Pat. No. 4,093,325 to Troccaz both show bottom bracket assemblies where a spindle is rotatably mounted in the bottom bracket by cartridge bearings. The inner races of the cartridge bearings are spaced apart by shoulders on the spindle while the outer races are spaced apart by a tubular spacer or shell. Axial alignment of the inner and outer bearing races in this case can only be accomplished by matching the width of the shoulders and the tubular spacer, using very tight dimensional tolerances.

U.S. Pat. No. 4,545,691 to Kastan shows a bottom bracket assembly for a bicycle where the inner races of the cartridge bearings are fit on the axle and are clamped between a shell and an adapter to fix their axial position. The outer races are butted against shoulders located in the bearing adapters. During initial assembly, the bearing adapters are allowed to float. The adapters are then tightened into axial alignment with the inner bearing races by a tapered split ring.

The present invention aims to provide a bottom bracket assembly for a bicycle, where in a simple construction cartridge bearings can be used advantageously.

SUMMARY OF THE INVENTION

According to the invention, there is provided a bottom bracket assembly for a bicycle that uses cartridge bearings. Inner races of the cartridge bearings are fit on the spindle and are fixed in both axial directions by abutting stop elements.

According to a first aspect of the invention, the outer races of the cartridge bearings are mounted such that they are free to move in both axial directions. This eliminates the need for very tight control of manufacturing dimensions and tolerances.

Providing the outer bearing races with adjacent gaps in both axial directions allows for these races to be shifted small distances during installation or under high load during use. The inventor has recognized that the inner bearing races are less likely to be damaged by high axial loads since the spindle provides good support for these races, especially if they are press-fit thereon. The outer bearing races, however, even if they are press-fit into the outer bracket portion, known as the adapters, are more likely to be damaged. The adapters are usually thin-walled and are often manufactured from lightweight materials. Consequently they do not provide as much support as the stiffer spindle. Allowing the outer races to float by a small amount axially when subjected to high loads, such as encountered in a crash situation, effectively helps to protect these bearing races from damage.

According to a second aspect of the invention, the inner races of the cartridge bearings are fit on the spindle and are clamped between abutting inner and outer stop elements. The ends of the spindle comprise adapting portions to receive crank arms. The stop elements fixing the inner races of the cartridge bearings on the spindle also serve as stop elements for the axial location of the crank arms.

Crank arm stop elements, henceforth known as crank stops, are useful because they provide consistent axial location of the crank arms when they are installed on the spindle. In prior art bottom brackets that allow the inner bearing races to float on the spindle to achieve correctly aligned races, crank stops could only be provided by steps included in the spindle. These steps increase machining complexity and lead to a reduction in bearing strength because the bearing must fit over the step. Consequently the inner bearing races must be a larger diameter than otherwise would be necessary. For a fixed outer bearing race diameter, using larger inner bearing races results in smaller bearing balls, thus reducing the overall load carrying capability and life of the bearing. Thus, according to the second aspect of the invention, there is provided a very simple construction to effectively utilize cartridge bearings of sufficient strength and provide crank stops without increased machining complexity.

Numerous other benefits and advantages will become apparent from the following detailed description of a preferred embodiment of the invention with reference to the drawings.

DETAILED DESCRIPTION OF PREFERRED EMBODIMENTS

Figure 1:
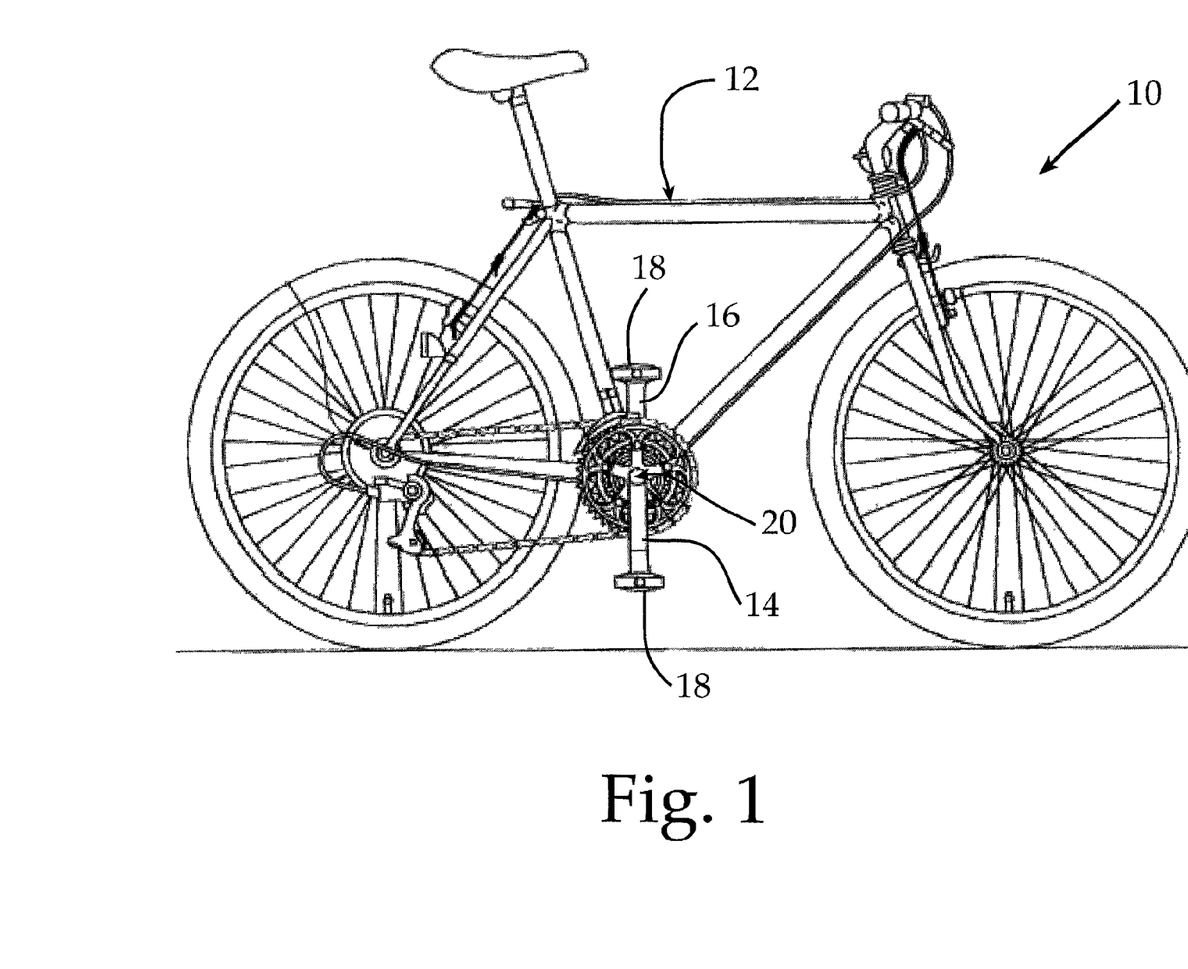
FIG. 1 shows a side view of a bicycle.

FIG. 1 generally shows a bicycle 10 with a bicycle frame 12, on which are mounted crank arms 14, 16 with pedals 18. Crank arms 14, 16 are connected to an axle 20, which is rotatably held in frame 12.

Figure 2:
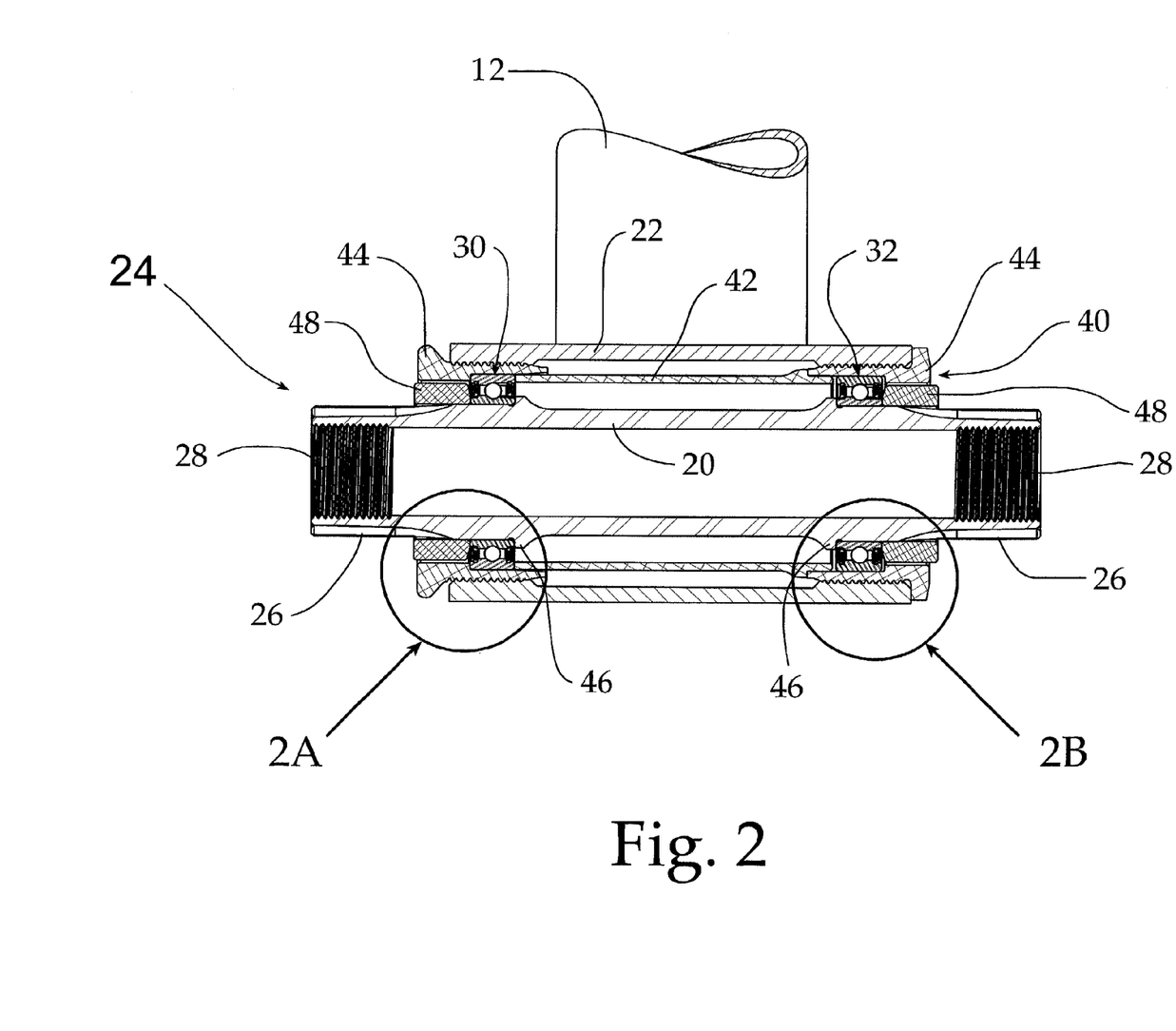
FIG. 2 shows a partial longitudinal cross-sectional view of a first embodiment of a bottom bracket of the bicycle from FIG. 1.

FIG. 2 shows an axial or longitudinal cross section of the area where the axle, or spindle 20, is received in the bicycle frame 12.

On top of FIG. 2 there is shown a tube forming part of the bicycle frame 12, attached to a tubular sleeve 22 containing a first embodiment of a bottom bracket assembly generally indicated as 24.

This first embodiment of a bottom bracket assembly according to the present invention includes the spindle 20, preferably of steel, which has adapting portions 26 on both axial ends to receive crank arms. The adapting portions 26 comprise an outer portion adapted to be received in the hub portion 54 of the cranks 14, 16 and an inner thread 28 for fixing the cranks to the spindle.

Figure 2A:
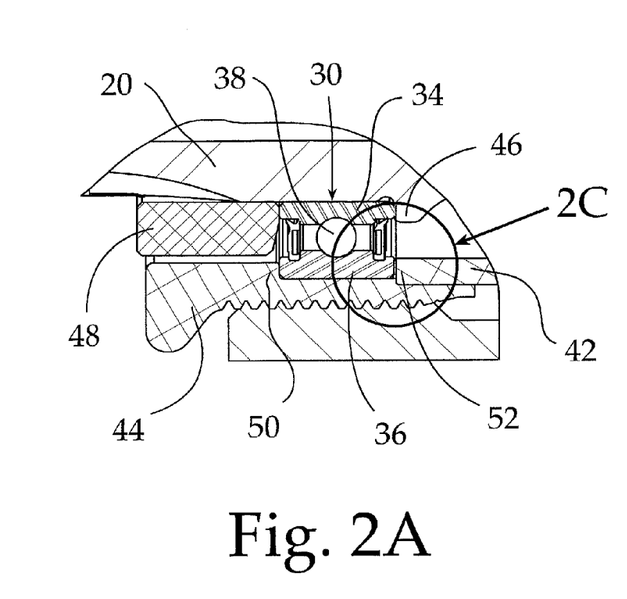
FIG. 2A is an enlarged fragmentary detail of the area labeled 2A in FIG. 2.

The spindle 20 is mounted in the bottom bracket by means of two cartridge bearings 30, 32 arranged near the ends of the bottom bracket assembly 24. Cartridge bearings 30, 32 are sealed cartridge bearings, available as readily assembled units. As can be seen in FIG. 2A, which is an enlarged view of the area 2A of FIG. 2, each cartridge bearing 30, 32 comprises inner and outer bearing races 34, 36 with bearing balls 38 there between.

The bottom bracket assembly 24 arranged in sleeve 22 comprises an outer bracket portion 40, consisting of a cartridge shell 42 and two adapter cups 44.

The inner bearing races 34 of cartridge bearings 30, 32 are press-fit over the spindle 20. Adapter cups 44 are fit onto the outer races 36 of cartridge bearing 30, 32, such that the outer races 36 are held in the outer bracket portion 40.

Spindle 20 has enlarged annular steps 46 arranged at a distance from its opposite ends. The inner bearing races 34 of cartridge bearings 30, 32 are fit on the spindle 20 and axially abut against steps 46.

Further fit on the spindle are stop rings 48 acting as crank stop elements. The crank stops 48 are press-fit over the spindle 20 and clamp the inner bearing races 34 between the crank stops 48 and the spindle steps 46. The inner bearing races 34 are thus axially fixed.

Figure 2B:
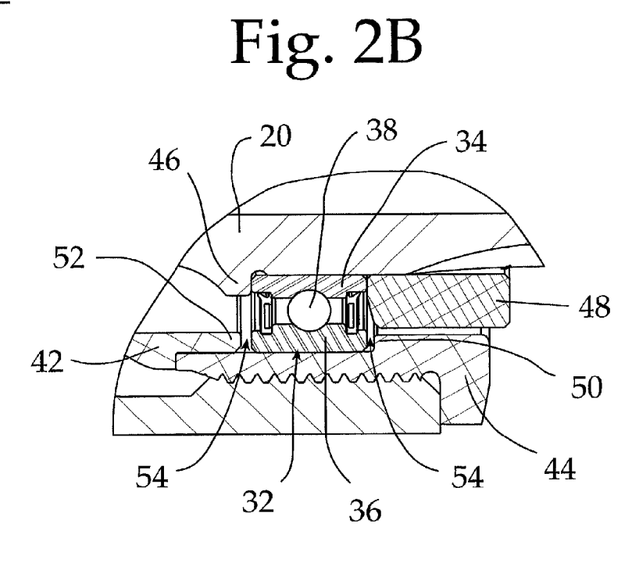
FIG. 2B is an enlarged fragmentary detail of the area labeled 2B in FIG. 2.
Figure 2C:
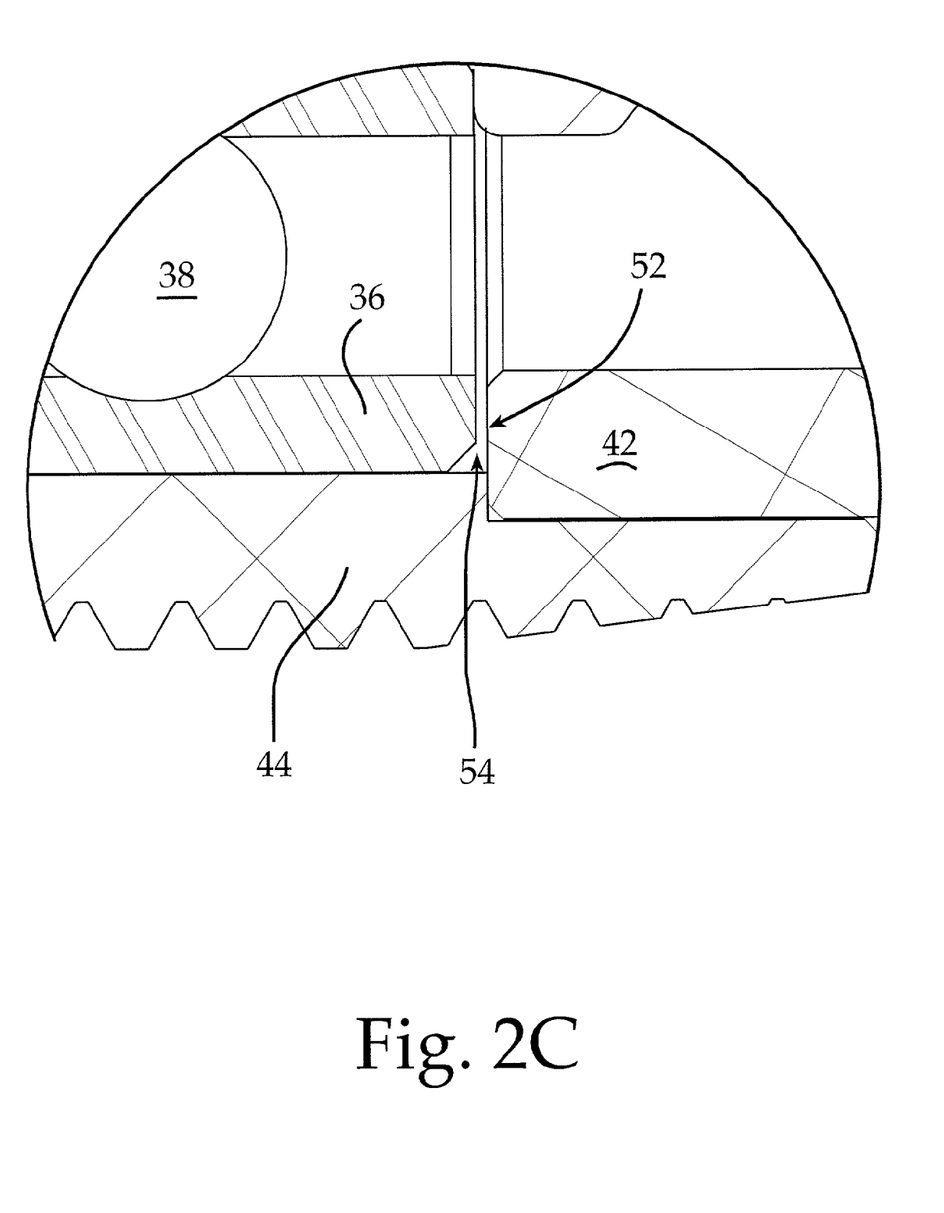
FIG. 2C is an enlarged fragmentary detail of the area labeled 2C in FIG. 2A.

On the other hand, the outer bearing races 36, which are received in the adapter cups 44, are free to float a small amount axially between a shoulder acting as bearing stop 50 of the adapter cups 44 and the axial ends 52 of the shell 42. As can be seen in FIGS. 2A, 2B and 2C, gaps 54 are provided to both axial sides of the floating outer bearing races 36. Gaps 54 may be of unequal size for each bearing. In the embodiment shown the outer race 36 of cartridge bearing 30 to the left in FIG. 2 has only very small gaps of 0.05 mm length, which are only visible in the enlarged view of FIG. 2C. The outer race 36 of cartridge bearing 32 to the right in FIG. 2 has gaps of roughly 0.5 mm, which allow the outer race 36, to axially move by the corresponding distance.

This bottom bracket assembly with axially fixed inner races 34 and floating outer races 36 eliminates the need for very tight dimensional tolerances. In prior constructions of this type, the length of sleeve 42 would have to match exactly the distance between spindle steps 46. According to the present invention, sleeve 42 is deliberately made shorter than that distance.

During installation, the outer bearing race 36 will axially move to a position where the inner and outer races of bearings 30, 32 are aligned. Also, if during use high axial loads occur, outer bearing races 36 can axially shift by a small amount to counter said loads, such as encountered in a crash situation. In case of excessive axial forces, one of the outer bearing races 36 will butt against either the bearing-stop 50 in the adapter 44 or the respective end 52 of the shell 42. Sufficiently close tolerances can be easily held in manufacturing to keep this axial movement under an amount noticeable by the bicycle rider. The present invention thus produces a bottom bracket assembly with correctly aligned inner and outer bearing races that is highly tolerant of variations in both the manufacturing process of the bottom bracket assembly itself and installation of the bottom bracket assembly into a bicycle frame 12.

As shown in FIG. 2, the bottom bracket assembly is installed in tube 22 of a typical bicycle frame 12 by outer threads provided on the adapter cups 44.

Figure 3:
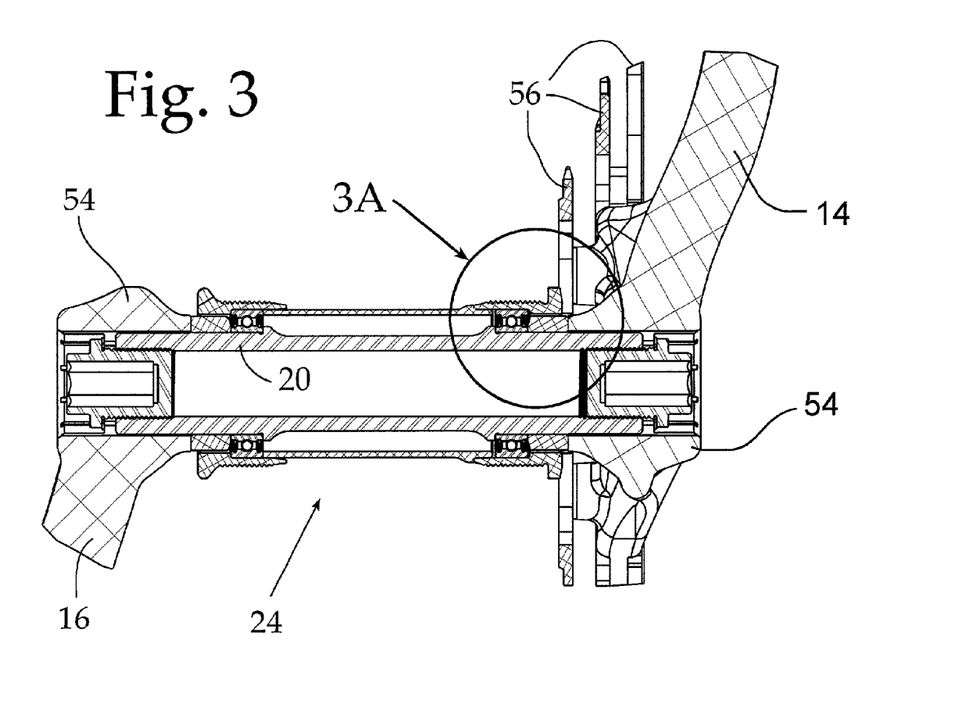
FIG. 3 is a partial longitudinal cross-sectional view of the bottom bracket assembly of FIG. 2 with installed crank arms.

FIG. 3 shows the bottom bracket assembly 24 with installed cranks 14, 16. Cranks 14, 16 each include a hub portion 54 with a central hole, which receives the adapting portions 26 at the ends of spindle 20. Adapting portions 26 in this first embodiment comprise a star-like outer cross-sectional shape with longitudinal splines at the ends of spindle 20. These splines are received in a correspondingly shaped hole of hubs 54, such that cranks 14, 16 are rotatably fixed onto spindle 20.

Figure 3A:
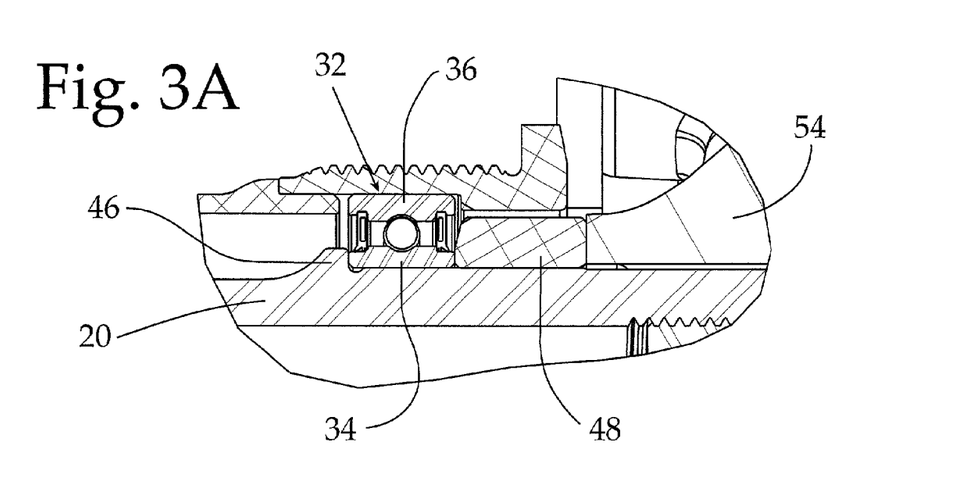
FIG. 3A is an enlarged fragmentary detail of the area labeled 3A in FIG. 3.

As can be seen in FIG. 3 and the enlarged view of FIG. 3A, hub portion 54 axially abuts against crank stop 48, thus ensuring consistent axial location of the crank arms when they are installed on the spindle 20. This is especially important with regard to crank arm 14 to the right in FIG. 3, which is shown to carry a number of sprockets 56. The defined axial location of these sprockets is important for optimum chain shifting operation.

As can be seen again in the enlarged view of FIG. 3A, the elements are provided on spindle 20, in the following order, from the inside to the outside: spindle step 46, inner race 34 of cartridge bearing 32, crank stop 48, crank hub 54.

Figure 4:
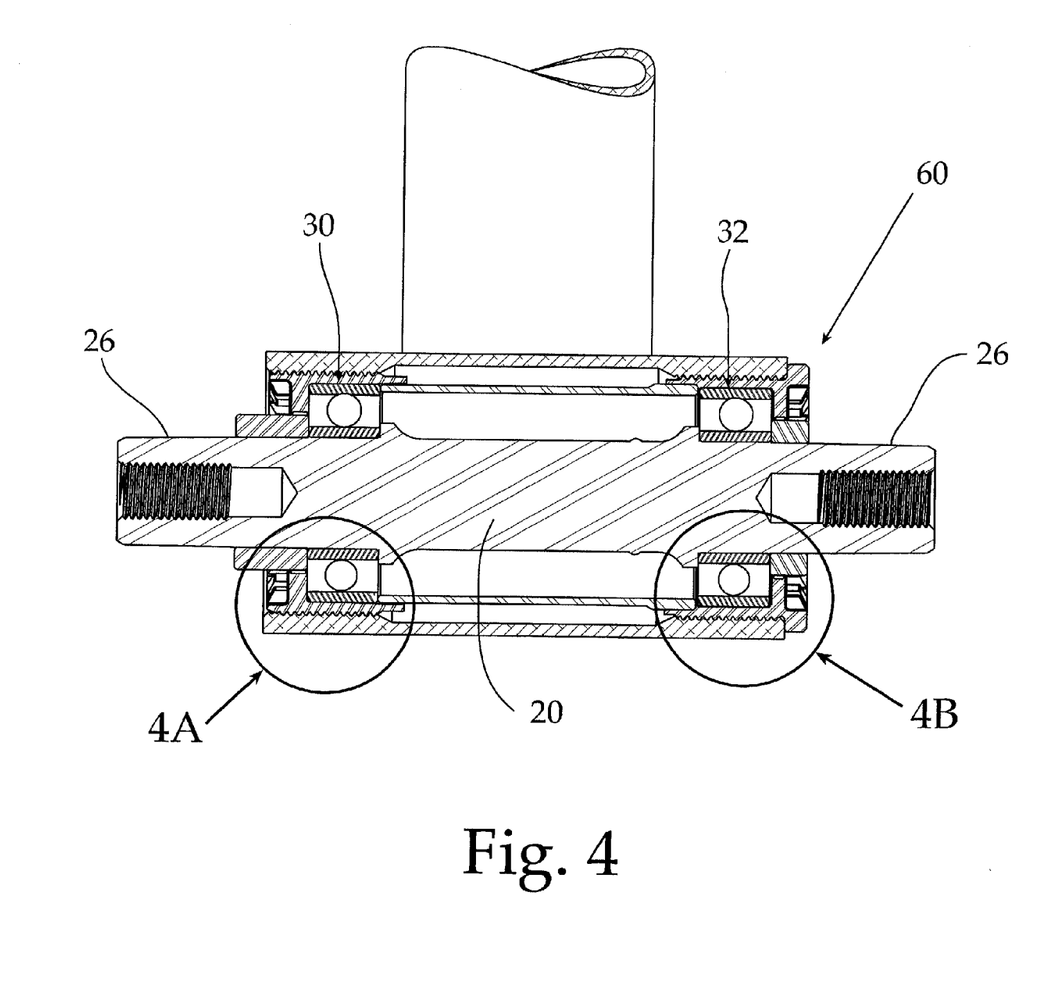
FIG. 4 is a partial longitudinal cross-sectional view of a second embodiment of a bottom bracket assembly.

FIG. 4 shows a second embodiment of a bottom bracket assembly 60. This second embodiment of a bottom bracket assembly closely resembles the first embodiment of FIGS. 2, 2A, 2B, 2C, 3, and 3A. The same reference numerals are used for corresponding elements. Bottom bracket assembly 60 will consequently not be described in detail, but reference will only be made to elements different from the first embodiment.

In the second embodiment, spindle 20 is solid and not hollow as the spindle of first embodiment. Also, adapting portions 26 for mounting crank arms are shaped differently. Instead of spline shaped adapting portions in the first embodiment, here adapting portions 26 of the spindle have a square cross-section. These adapting portions 26 can be received in correspondingly shaped hub portions of crank arms (not shown) in the same way as the spline shaped adapting portions shown in FIG. 3.

Figure 4A:
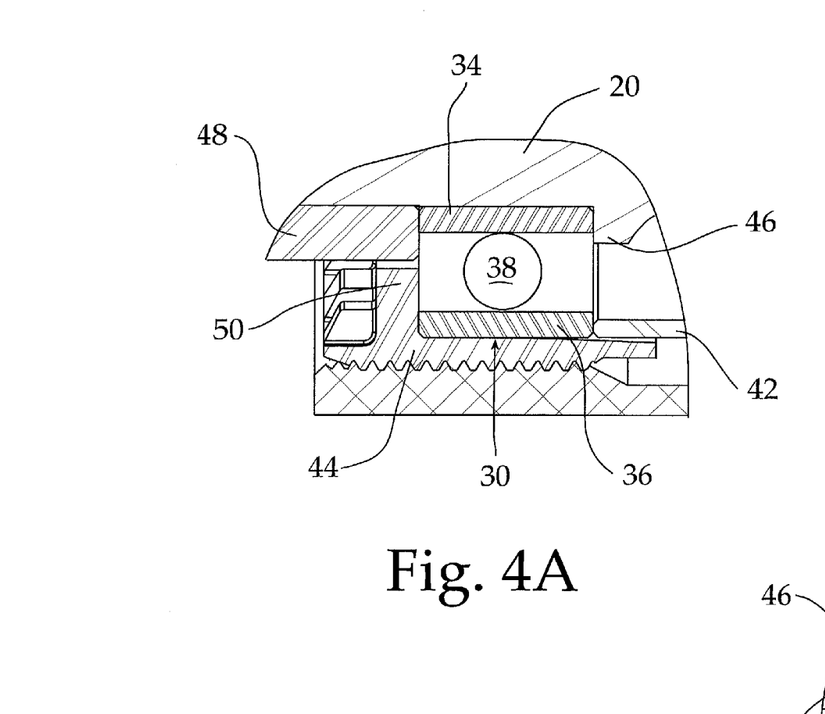
FIG. 4A is an enlarged fragmentary detail of the area labeled 4A in FIG. 4.
Figure 4B:
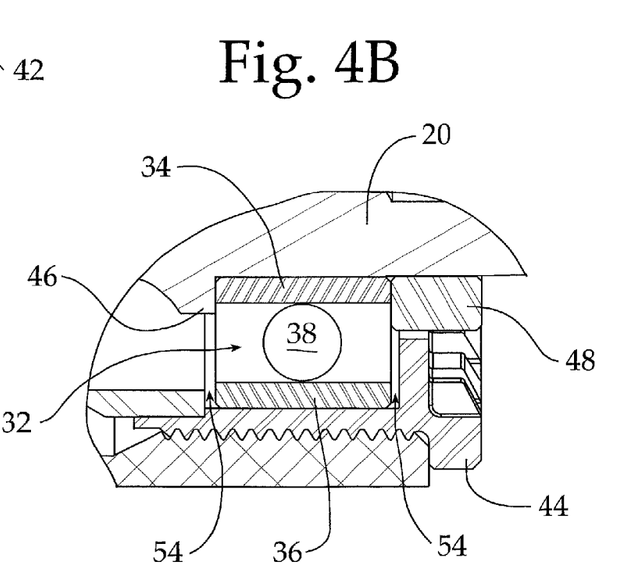
FIG. 4B is an enlarged fragmentary detail of the area labeled 4B in FIG. 4.

As in the first embodiment, cartridge bearings 30, 32 are provided. The inner races 34 of cartridge bearings 30, 32 are clamped between steps 46 on the spindle 20 and crank stops 48, such that they are axially fixed. Of the outer bearing races 36, the outer bearing race of cartridge bearing 30 to the left in FIG. 4, shown in detail in FIG. 4A is also axially fixed. As shown in the enlarged view of FIG. 4A the end of shell 42 and bearing stop 50 of adapter cup 44 axially abut against the interposed outer race 36 of cartridge bearing 30.

On the other hand, outer race 36 of cartridge bearing 32 to the right in FIG. 4 has gaps 54 provided at both axial ends thereof, such that it can move axially by a small amount.

It has been found that the above construction with only one outer race being allowed to float is enough to correctly align the bearing races and eliminate the need for tight dimensional tolerances.

Figure 5:
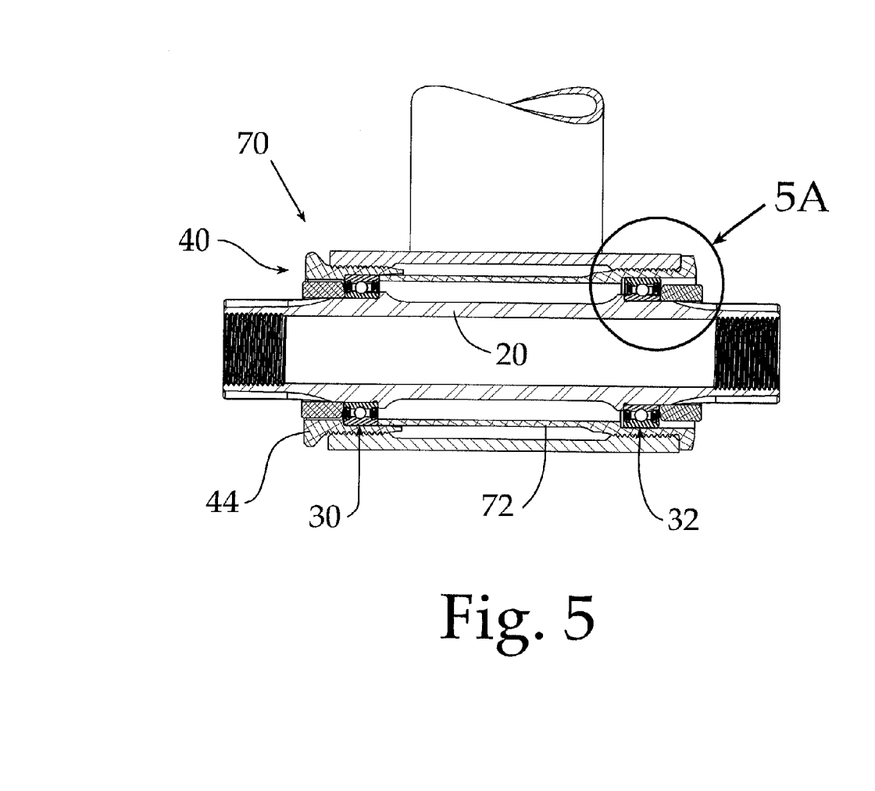
FIG. 5 is a partial longitudinal cross-sectional view of third embodiment of a bottom bracket assembly.

FIG. 5 shows a third embodiment of a bottom bracket assembly 70. Again, the construction resembles first and second embodiments. The same reference numerals are used for corresponding elements. The third embodiment will not be explained in detail, but reference will be made only to the differences to the first and second embodiments.

Figure 5A:
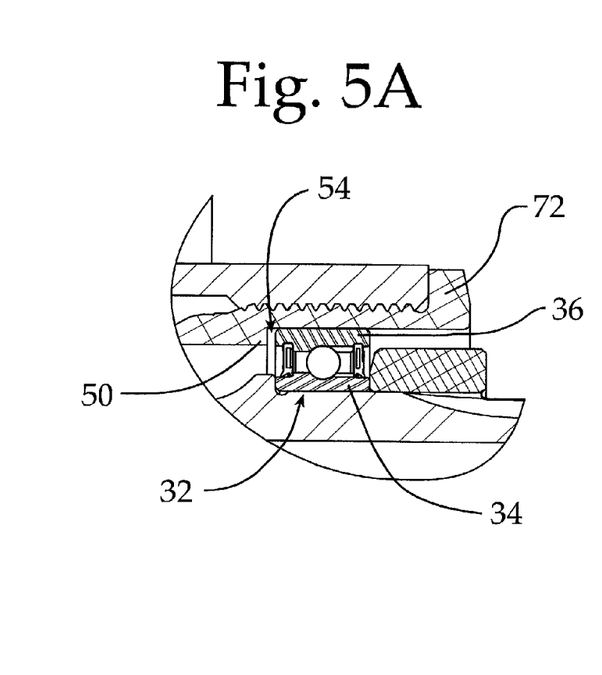
FIG. 5A is an enlarged fragmentary detail of the area labeled 5A in FIG. 5.

As can be seen in FIG. 5, spindle 20 is mounted with cartridge bearings 30, 32 in outer bracket portion 40. In the third embodiment the outer bracket portion 40 only comprises one adapter cup 44. The other adapter cup is integrated with the cartridge shell to form a single component 72. As can be seen in the enlarged view of FIG. 5A, this configuration produces a bottom bracket assembly in which the outer race 36 of the right end bearing 32 can float axially. Combination element 72 has a bearing stop 50 to limit axial movement of the inner bearing race 36 to one side. On the other axial side of the outer bearing race 36, the outer bracket portion is open.

Although the invention has been explained in relation to its preferred embodiments, it is to be understood that many other possible modifications and variations can be made without departing from the spirit and scope of the invention as hereinafter claimed.

What is claimed is:

1. A bottom bracket assembly for a bicycle comprising a spindle that is rotatably held in an outer bracket portion with at least two cartridge bearings, each including outer and inner races, where:
   a) the inner races of said cartridge bearings are fit onto said spindle and the outer races of said cartridge bearings are fit into said outer bracket portion;
   b) both said inner races are fixed on said spindle in both axial directions by abutting inner and outer stop elements;
   c) at least one of said outer races is mounted in said outer bracket portion, said outer race having an initial position such tat said outer race is free to move in both axial directions from said initial position.

2. The bottom bracket of claim 1 in which at least one step is provided on the spindle as an inner stop element.

3. The bottom bracket of claim 1 in which stop rings are provided as outer stop elements.

4. The bottom bracket of claim 1 in which said outer bracket portion consists of at least one adapter and a cylindrical sleeve, wherein said adapter and/or said sleeve provide shoulders to limit axial movement of said outer bearing races, and where gaps are provided between the axial end surfaces of said outer race and said shoulders that allow the outer races to move axially.

5. A bottom bracket assembly for a bicycle comprising a spindle rotatably held in an outer bracket portion with at least two cartridge bearings each including outer and inner races, where:
   a) the inner races of said cartridge bearings are fit onto said spindle and the outer races are fit into said outer bracket portion;
   b) both said inner races are fixed in both axial directions by abutting inner and outer stop elements provided on said spindle;
   c) the ends of said spindle comprise adapting portions to receive crank arms such that said crank arms abut against the outer stop elements in an axial direction;
   d) at least one of said outer races is mounted in said outer bracket portion, said outer race having an initial position such that said outer race is free to move in both axial directions from said initial position.

6. The bottom bracket of claim 5 in which at least one step is provided on the spindle as an inner stop element.

7. The bottom bracket of claim 5 in which stop rings are provided as outer stop elements.

8. The bottom bracket of claim 5 in which both outer races are free to move in both axial directions.

9. A bicycle with two crank arms and attached pedals in which:
   a) said crank arms are connected to a spindle arranged rotatably in a bottom bracket;
   b) said bottom bracket comprises an outer bracket portion and at least two cartridge bearings, each including inner and outer races;
   c) the inner races of said cartridge bearings are fit onto said spindle and the outer races are fit into said outer bracket portion, the outer races having an initial position such that the outer race is free to move in both axial directions from said initial position;
   d) said spindle includes at least one inner stop element which abuts against both of said inner races in one axial direction, and there are outer stop elements provided which abut against both of said inner races in the other axial direction, such that both of said inner races are fixed on said spindle in both axial directions;

e) the ends of the said spindle comprise adapting portions to receive said crank arms such that said crank arms abut against the outer stop elements in an axial direction.

10. A bottom bracket assembly for a bicycle comprising a spindle that is notably held in an outer bracket portion with at least two cartridge bearings, each including outer and inner races, where:

the inner races of said cartridge bearings are fit onto said spindle and the outer races of said cartridge bearings are fit into said outer bracket portion;

both said inner races are fixed on said spindle in both axial directions by abutting inner and outer stop elements;

at least one of said outer races is mounted in said outer bracket portion such that it is free to move m both axial directions; and at least one step is provided on the spindle as an inner stop element.

* * * * *